United States Patent [19]
Maveddat et al.

[11] Patent Number: 6,070,073
[45] Date of Patent: May 30, 2000

[54] COMMUNICATION SYSTEM AND METHOD FOR NOTIFICATION AND CALL ROUTING IN A MOBILE SATELLITE NETWORK

[75] Inventors: Payam Maveddat; Fereldoun Homayoun; Wing Lo, all of Plano, Tex.

[73] Assignee: Nortel Networks Corporation, Canada

[21] Appl. No.: 08/993,472

[22] Filed: Dec. 18, 1997

[51] Int. Cl.[7] .............................. H04Q 7/20; H04B 3/36; H04B 1/60; H04M 7/00

[52] U.S. Cl. ........................ 455/428; 455/427; 455/430; 455/8; 455/10; 379/221

[58] Field of Search .................................. 455/427, 428, 455/429, 430, 12.1, 13.1, 13.2, 8, 9, 10, 4, 67.1, 13.4; 379/221, 26, 22, 23

[56] References Cited

U.S. PATENT DOCUMENTS

| | | | |
|---|---|---|---|
| 4,287,598 | 9/1981 | Langseth et al. | 455/505 |
| 5,469,468 | 11/1995 | Schilling . | |
| 5,513,378 | 4/1996 | Ranz et al. | 455/8 |
| 5,537,679 | 7/1996 | Crosbie et al. | 455/13.2 |
| 5,604,920 | 2/1997 | Bertinger et al. . | |
| 5,659,487 | 8/1997 | Cho et al. | 709/200 |
| 5,664,006 | 9/1997 | Monte et al. | 455/405 |
| 5,826,188 | 10/1998 | Tayloe et al. | 455/428 |
| 5,828,952 | 10/1998 | Sawyer | 455/427 |
| 5,842,126 | 11/1998 | Sawyer et al. | 455/428 |
| 5,918,157 | 6/1999 | Wiedeman et al. | 455/13.1 |

OTHER PUBLICATIONS

Bruce Gerding, "Personal Communications Via Satellite: An Overview," (Feb. 12, 1996).

*Primary Examiner*—William G. Trost
*Assistant Examiner*—Raymond B. Persino
*Attorney, Agent, or Firm*—Carr & Storm LLP

[57] ABSTRACT

A communication system and methodology are implemented to anticipate periodic or predictable disruptions of communications in a satellite communication network. The communication system and methodology then compensate for this disruption in an appropriate manner. Such prediction and compensation actions are performed for a selected group of subscribers ("premium" subscribers) who wish to originate or receive telephone calls during the period of time that the outage or disruption occurs. To compensate for such predictable outages, the communication network takes advantage of the multiple gateways typically implemented within mobile satellite communicate networks. Rather than using the multiple gateways for redundancy, the communication network and methodology recognize that the multiple gateways may also be used for the alternate routing of telephone calls, particularly during a period of time in which the outage occurs. Through this methodology, a "virtual routing" operation may be executed.

35 Claims, 10 Drawing Sheets

COMMUNICATION SYSTEM AND METHOD FOR NOTIFICATION AND CALL ROUTING IN A MOBILE SATELLITE NETWORK

BACKGROUND INFORMATION

While most cellular phone systems implemented today use land-based communication networks, personal satellite communication systems have been developed and continue to evolve to allow communication between any two places on earth much easier and efficient. Typically, international telecommunication satellites operate from a geo-stationary orbit (GEO) that is approximately 36,000 kilometers above earth. From this point, the satellite appears to remain fixed above a single spot on the Earth. Alternatively, telecommunication satellites have also been implemented in orbits closer to Earth that are referred to as low Earth orbits (LEOs) and medium Earth orbits (MEOs). Satellites in LEOs orbit at altitudes between 780 kilometers and 1390 kilometers. Satellites in MEOs orbit at an altitude of approximately 10,000 kilometers.

FIG. 1 illustrates a typical satellite environment, where the satellite may be orbiting at either a geostationary orbit, a low Earth orbit, or a medium Earth orbit. However, for simplicity in this explanation, it will be assumed that satellite 102 of FIG. 1 is a GEO-based satellite. GEO mobile satellite systems are able to determine where mobile subscribers are located and where traffic is routed based on information stored in a home location register (HLR), such as HLR 114. Additionally, GEO mobile satellite systems may also determine the location of subscribers based on a visiting location register (VLR), such as that included, but not illustrated in detail, in Gateway A 110 and Gateway B 104. Through the selective use of the HLR and VLR, locations of mobile telephone subscribers may be determined to within a small service area. In addition to an HLR that stores subscriber service profile and location information, a typical GEO mobile satellite network includes a mobile switching center (MSC) for performing call processing, connection control, and traffic routing that take place between a public switched telephone network (PSTN) 108 and the GEO mobile satellite network. In FIG. 1, both Gateway A 110 and Gateway B 104 include MSCs (not illustrated in detail). Additionally, Gateway A 110 and Gateway B 104 comprise radio and satellite interface units (SIU) for communication and transmission to and from satellite 102. During operation, satellite 102 acts as a radio system with multiple beams. The beams output by satellite 102 are different for gateways (104, 110) and mobile subscriber terminals (106). In general, the beams used by satellite 102 to communicate with mobile subscriber terminal 106 are narrow spot beams with high power density. In contrast, the beams output by satellite 102 to communicate with gateways (104, 110) usually allow for broader coverage and have a lower power density. It should be noted that satellite 102 may support one or multiple gateway beams, and, in general, many or multiple mobile subscriber terminal beams. Operation of each of the components of Gateway A 110 and Gateway B 104 are well-known to those with skill in the data processing art and, therefore, will not be described in greater detail herein.

FIG. 1 also illustrates a mobile subscriber terminal 106 where telephone calls are delivered or originated, and a network control center 112 where communications between satellite 102 and gateways 10 and 104, as well as frequency allocations, are managed and monitored. Furthermore, the satellite communication network 100 of FIG. 1 contemplates the use of a short message service (SMS) and a voice mail service (VMS) that is provided via data processor 118.

During operation of the satellite communication system, the uplink/downlink between satellite 102 and Gateways 104 and 110 operates at a high bandwidth, usually in the 100 MHz range. Furthermore, each Gateway (104 and 110) is assigned a set of frequencies which it transmits and receives traffic to and from satellite 102. In GEO-based communication networks, the satellite selectively assigns an incoming slot to a selected downlink beam. By using such techniques, the satellite may act as a switch or cross-connect between the two Gateways.

In connecting the two gateways, the analogy between the satellite cellular structure and the cellular mobile telephone system becomes more apparent. In the cellular mobile system, cellular sites are fixed and users are mobile. As the user of a mobile telephone system travels from one cell site to another, the user's telephone call is handed off from one cellular switching unit to another. Conversely, users of the LEO satellite cellular system are relatively fixed at any given time, while the satellites, which are the cells, are in continuous movement. With the hand-held or vehicle mounted mobile telephone, connection to one of the satellite switches is made directly from the hand-held mobile unit (MS 106) or a remotely fixed telephone (not illustrated in detail herein) to one of the nearest satellite moving about the earth. As the satellite that originally serves a particular user leaves a cell of that switch, the user's telephone call is "handed off" to an appropriate adjacent cell. Adjacent cells may be cells within one satellite or cells of other satellites located either in a particular orbiting plane or an adjacent orbiting plane. Furthermore, while users may "roam," this roaming speed is relatively small compared to the travelling speed of the satellite switches.

In another similarity to the cellular mobile telephone system, the satellite cellular communication system provides spectral efficiency. This means that the same frequency may be simultaneously used by different satellites, wherein spectral efficiency is provided by the special diversity between the satellite and users. Additionally, the users may be located anywhere on a land mass, on the water or in the air at an altitude less than that of the low-earth orbiting satellites. For example, a person on one land mass could call a person on another land mass, a person on a boat or a person in an aircraft. For additional information about a satellite cellular telephone and data communication system, refer to U.S. Pat. No. 5,604,920 by Bertiger, et al., which is hereby incorporated by reference herein.

During operation of a satellite communication system 100 of FIG. 1, it should be noted that service provided by the satellite may be interrupted for a myriad of reasons. Refer now to FIG. 2. As illustrated in FIG. 2, one predictable outage is the result of the sun and the electromagnetic field generated by the sun's rays during particular points in time. During service disruptions that occur as a result of a solar outage, otherwise known as a sun transit, the sun, satellite and gateway line up in a format that allows the electromagnetic field generated by the sun's rays to overwhelm the downlink between the satellite and the gateways for a brief period of time. For a GEO satellite system, this disruption typically occurs for two to four minutes once a week. Sun transit is a well-known phenomenon and is very predictable.

However, during the period of time in which a solar outage occurs, communication for mobile system users is interrupted, thus significantly degrading the quality of service provided to the mobile user. Additionally, such interruptions may be extremely detrimental in time sensitive communications that may be in process. Furthermore, given the fact that an entire gateway is affected by this solar transit problem, a whole group of subscribers is impacted by such a communication interruption. Thus, such interruptions, although predictable, adversely affect large numbers of mobile subscribers.

It should be noted that outages other than sun transit outages are also predictable in GEO-based satellite networks. Such additional outages may be due to maintenance or repair, among others.

Therefore, a need exists for a mechanism within a mobile satellite communication network that compensates for such predictable outages and allows users to continue their telephone calls, even when such predictable outages occur for some of the many satellite-to-surface communication links.

SUMMARY OF THE INVENTION

The previously mentioned needs are fulfilled with the present invention. Accordingly, there is provided, in a first form, a communication system. The communication system includes a first communication means for selectively routing data to a first device in response to a first plurality of control signals. The first communication device detects a first outage event and provides a second plurality of control signals in response to the first outage event. The communication system includes a second communication means and a satellite for communicating the first plurality of control signals and the second plurality of control signals with the first communication device. The satellite selectively reroutes the first plurality of control signals from the first communication device to the second communication device in response to the second plurality of control signals.

Additionally, there is provided, in a second form, a method for operating a communication system having a user. The method includes the steps of detecting a first outage event and providing a first plurality of control signals to a first communication device. The method also includes the step of communicating a first message to the user to indicate that the first outage event has been detected.

Furthermore, there is provided, in a third form, a program storage device readable by a machine, tangibly embodying a program of instructions executable by the machine to perform method steps for communicating a first incoming message to a user of a communication system. The method steps include detecting a first outage event, providing a first plurality of control signals to a first communication device, and communicating a first message to the user to indicate that the first outage event has been detected.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention implements a communication system and methodology for anticipating periodic or predictable disruptions of communications in a satellite communication network and then compensating for this disruption in an appropriate manner. In one embodiment of the present invention, such prediction and compensation actions are performed for a selected group of subscribers ("premium" subscribers) who wish to originate or receive telephone calls during the period of time that the outage or disruption occurs. To compensate for such predictable outages, the communication network of the present invention takes advantage of the multiple gateways typically implemented within mobile satellite communication networks. Rather than using the multiple gateways to minimize a transmission path on the terrestrial PSTN network, the present invention recognizes that the multiple gateways may also be used for the alternate routing of telephone calls, particularly during a period of time in which the outage occurs. Such alternate routing is referred to as "virtual routing."

It should be noted that the term "virtual routing" is used to describe the routing mechanism of the present invention because this routing mechanism allows premium subscribers to appear as though they have roamed to a different cellular system, or gateway, even though the premium subscribers have not physically moved. It should be noted that a cellular roaming operation involves the physical movement of a mobile subscriber terminal from one cellular system to another cellular system. Service is maintained to the roaming mobile subscriber terminal by forwarding in-coming calls to a roaming mobile subscriber terminal to the system the mobile is currently physically located within. In a satellite system, a gateway is equivalent to one cellular system. If one gateway is taken out of service, the premium subscribers served by the out-of-service gateway will be served by another gateway. Therefore, from a signalling and routing point of view, it appears as though the premium roaming terminals have "roamed" to the alternate gateway even though they did not move physically from the area served by the out-of-service gateway. Thus, the term "virtual routing" is used.

Figure 4:
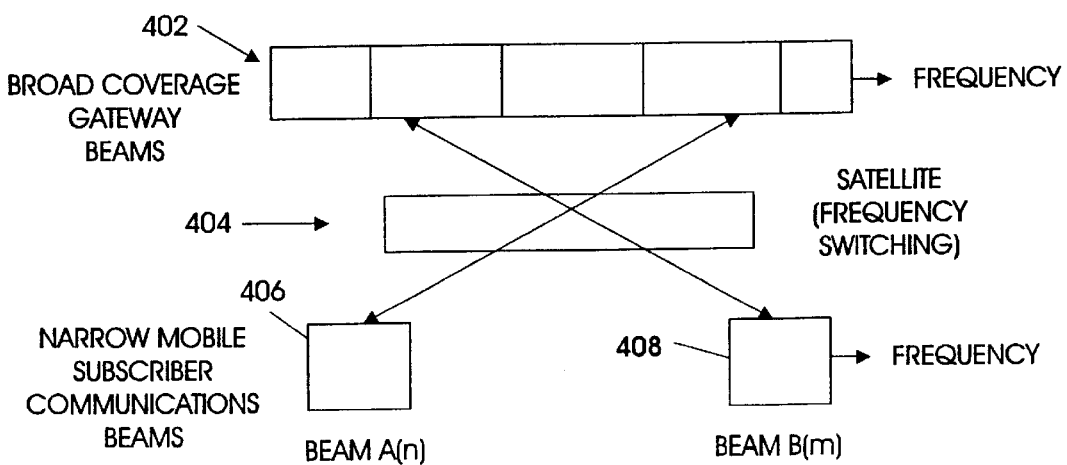
FIG. 4 illustrates, in block form, a satellite channel assignment protocol in accordance with one embodiment of the present invention.
Figure 3:
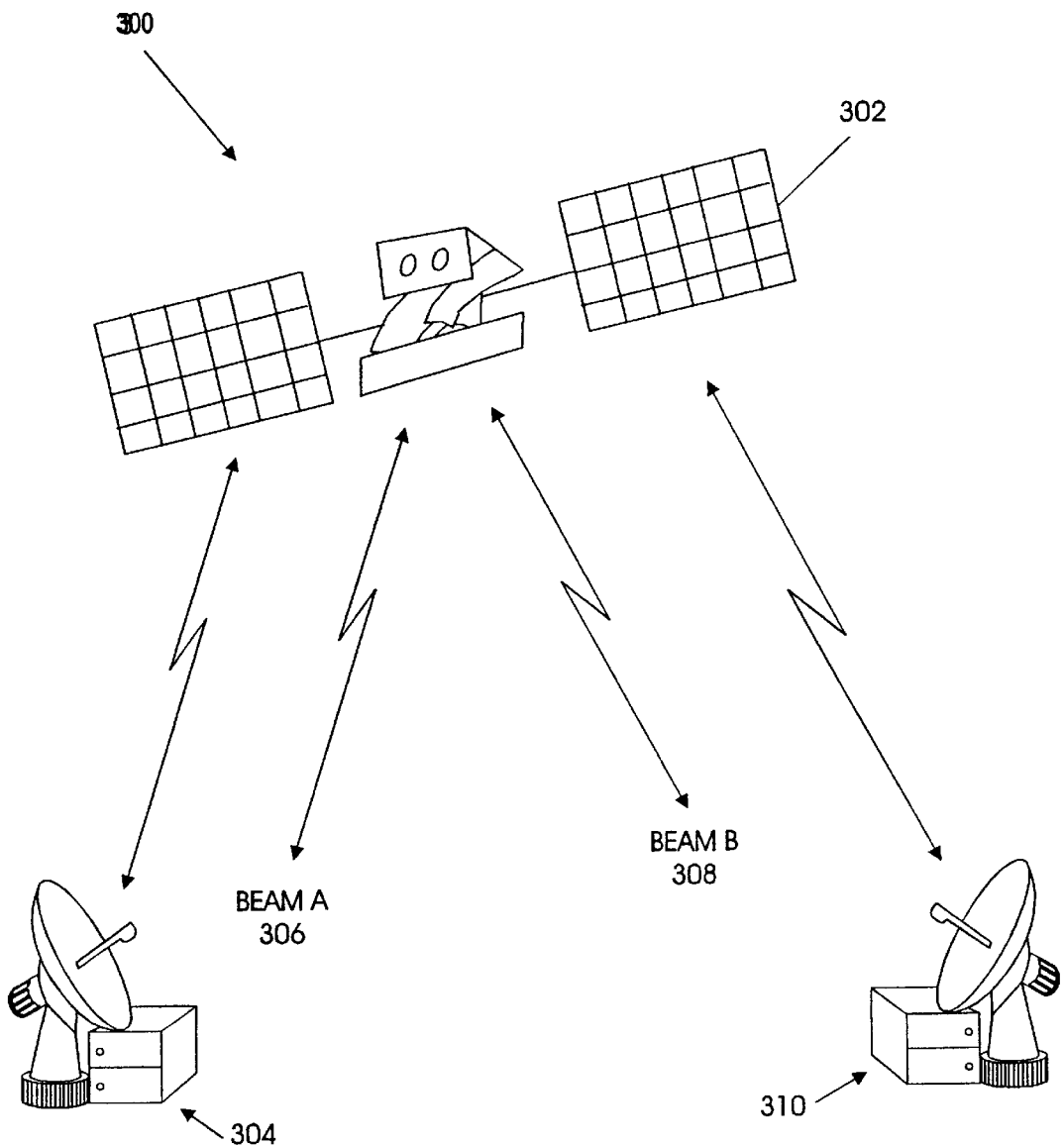
FIG. 3 illustrates, in block diagram form, a satellite communication system in accordance with one embodiment of the present invention.

Refer now to FIG. 3. FIG. 3 illustrates a simplified version of the communication system of FIG. 1. Within FIG. 3, satellite 302 communicates with a Gateway A 304 and a Gateway B 310 using a beam A 306 and a beam B 308. It should be noted that beam A 306 and beam B 308 are used for communication with mobile subscriber terminals. These beams are different from the beams used by a satellite to communicate with gateways. In satellite communication system 300, an uplink and downlink between satellite 302 and both Gateway A 304 and Gateway B 310 operate at a high bandwidth, usually in the 100 MHz range. During operation, each Gateway is assigned to a frequency slot within which it transmits and receives data to and from satellite 302. Thus, in mobile communication network 300, satellite 302 switches an incoming data stream to a pre-assigned downlink beam. This switching operation is illustrated in FIG. 4. Thus, satellite 302 may switch a beam A 306 to a frequency corresponding to Gateway B 310. Likewise, satellite 302 may switch a beam B 308 provided by Gateway B 310 to Gateway A 304 in one switching configuration. The present invention recognizes this switching and cross-connecting capability of a satellite and utilizes it in a unique manner to compensate for outages, such as sun transit and other predictable outages.

To compensate for such communication disruptions, the present invention re-routes the call from a disrupted gateway to another gateway which is not disrupted. A "virtual" routing" operation which makes use of the roaming capability of a mobile satellite system is used to implement such re-routing steps. During execution of the re-routing, a technique is implemented to inform subscribers in a first area covered by a first gateway when an outage is about to occur. In addition to this notification, the present invention enables a second gateway to take control of traffic routing during the outage until normal operation is once again resumed by the first gateway. At that point in time, control of traffic routing for subscribers within the first gateway will revert back to the first gateway. The techniques and systems used to implement this switching function will subsequently be described in greater detail.

It should be noted that in the following description, numerous specific details are set forth to provide a thorough understanding of the present invention. However, it will be obvious to those skilled in the art that the present invention may be practiced using procedures other than those specified herein. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and providing such details are within the skills of persons of ordinary skill in the relevant art. Additionally, during the description of the implementation of the present invention, the terms "assert" and "negate" and various grammatical forms thereof may be used to avoid confusion when dealing with a mixture of "active high" and "active low" logic signals. "Assert" is used to refer to the rendering of a logic signal into its active or logically true, state. "Negate" is used to refer to the rendering of a logic signal to its inactive, or logically false, state.

Refer now to the drawings wherein depicted elements are not necessarily shown to scale and wherein like or similar elements are designated by the same reference numeral through the several views.

Figure 1:
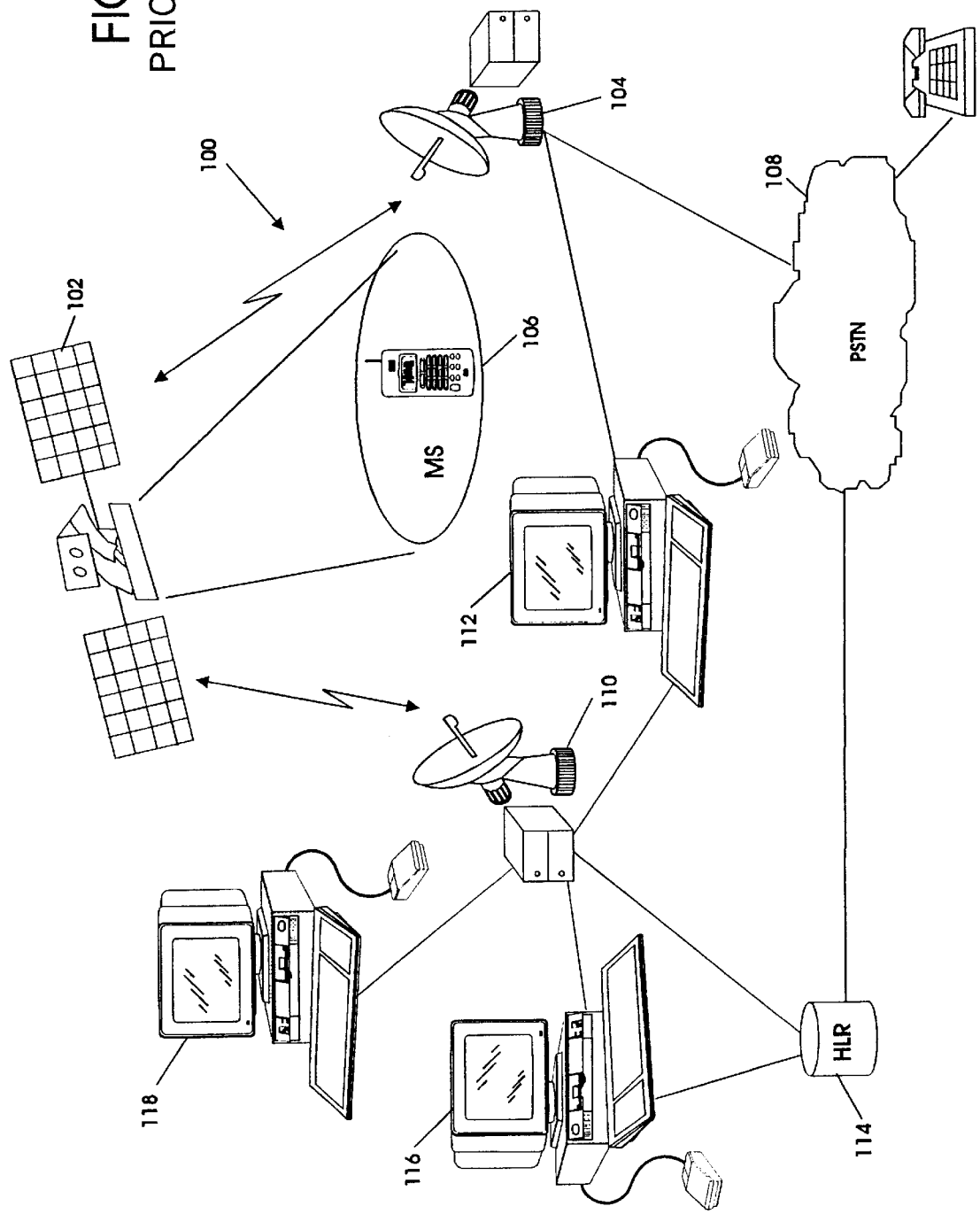
FIG. 1 illustrates, in block diagram form, a satellite communication system in accordance with one embodiment of the present invention.
Figure 2:
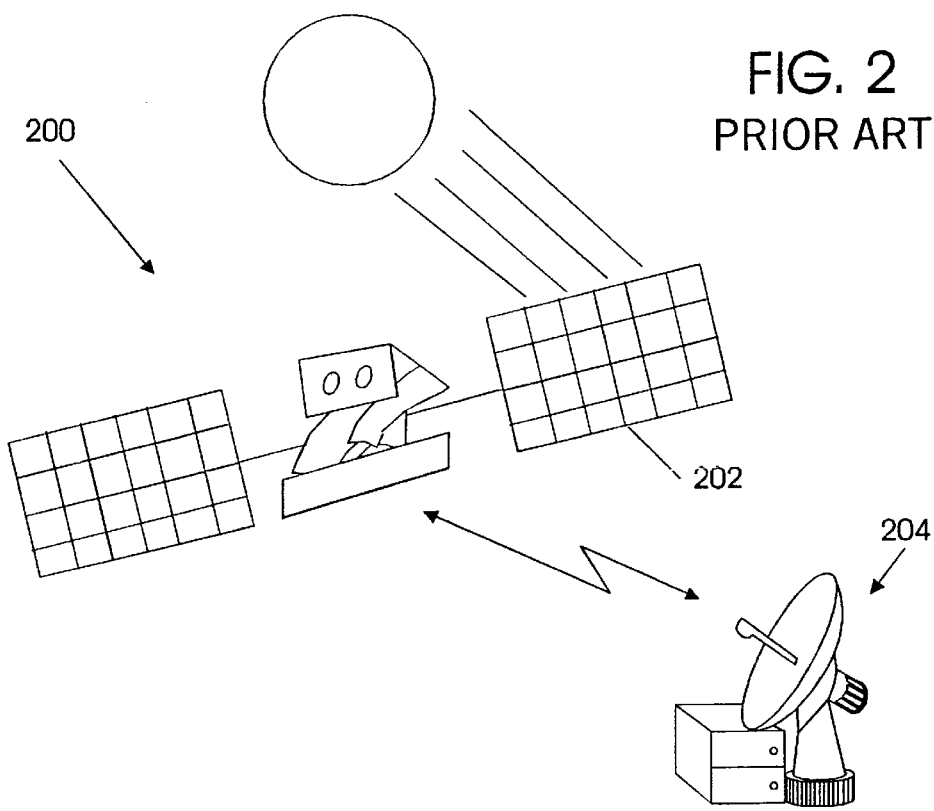
FIG. 2 illustrates, in block diagram form, a satellite communication system in accordance with one embodiment of the present invention.

Operation of the present invention will subsequently be described in greater detail. Refer to FIG. 1 for a general environment in which the communication network and methodology of the present invention may be implemented in one embodiment of the present invention. As was previously described, a mobile satellite communication network 100 functions in a manner that is very similar to a land-based cellular network. Therefore, prior to describing operation of the present invention in great detail, a general description of operation of each of the components of the mobile satellite communication network 100 of FIG. 1 will be provided herein.

During operation of a mobile satellite communication network, satellite 102 provides beams to selected gateways 110 and 104. It should be noted that the beams generated by satellite 102 are analogous to cells within a land-based mobile telephone system. A mobile subscriber 106 is associated with a first mobile switching center (MSC), that is collectively illustrated as Gateway/MSC/VLR A 110 of FIG. 1.

While mobile subscriber 106 is traveling within an area corresponding to its home mobile switching center 110, the mobile subscriber 106 is registered to the home system. The home location register (HLR) 114 will indicate the mobile subscriber as located in the home system. The HLR 114 includes a network database that stores information about mobile subscribers, together with a current location of each mobile subscriber. However, when mobile subscriber 106 travels away from the area served by the home gateway 110 into an area served by gateway 104, the mobile subscriber 106 will detect the service offered by the gateway B 104. The Gateway/MSC/VLR B service offering will include an invitation to register therein.

When the registration is received, Gateway/MSC/VLR B 104 performs a location update with HLR 114. Gateway/MSC/VLR B 104 sends a location update message to the HLR 114, informing HLR 114 that mobile subscriber 106 is served by Gateway/MSC/VLR B 104. HLR 114 then sends a subscriber profile, detailing the service mobile subscriber 106 is subscribed to, and authentication information to MSC 104. MSC 104 will store a copy of the profile information in its VLR. HLR 114 will also send a message to Gateway/MSC/VLR A 110 to indicate that mobile subscriber 106 is no longer served by Gateway/MSC/VLR A 110.

During the location update process, HLR 114 may optionally request that mobile subscriber 106 be authenticated. If authentication is invoked, HLR 114 will send a pair of authentication challenge data and authentication response data to MSC (104). MSC (104) will send an authentication challenge message to mobile subscriber 106 containing the authentication challenge data from HLR 114. Mobile subscriber 106 will then respond with an authentication response message after, MSC (104) compares the authentication response data from HLR 114 with the content of the authentication response message from mobile subscriber 106 to determine the authenticity of mobile subscriber 106.

Subsequently, when a call is received by Gateway/MSC/VLR A 110 for mobile subscriber 106, a home MSC in Gateway/MSC/VLR A 110 will consult HLR 114 to determine a MSC serving mobile subscriber 106. If HLR 114 indicates mobile subscriber 106 is registered with the MSC in Gateway/MSC/VLR B 104, the home MSC in Gateway/

MSC/VLR A 110 forwards the call to the serving MSC in Gateway/MSC/VLR B 104. The MSC in Gateway/MSC/VLR B 104 then pages mobile subscriber 106 and sets up the call. If HLR 114 indicates mobile subscriber 106 is registered with the home system, the home MSC delivers the call directly.

The switching and cross-connecting capabilities of satellite 102 are well-known to those with skill in the art and, therefore, will not be described in greater detail herein.

Furthermore, as previously alluded to, network control center 112 manages and monitors communications between satellite 102 and each of gateways 104 and 110. Intelligent peripheral 116 indicates service trigger points and provides activation information. Additionally, communication network 100 includes a processing system 118 capable of implementing a short message service (SMS) and a voice mail service (VMS) capability. To implement an SMS system, reference may be made to a co-pending patent application entitled "Methods and Apparatus for Providing Communications to Telecommunications Terminals," filed Feb. 26, 1998, Ser. No. 09/032,504, which is hereby incorporated by reference herein. Additionally, voice mail services are well-known to those with skill in the art and, therefore, will not be described in greater detail herein.

Figure 11:
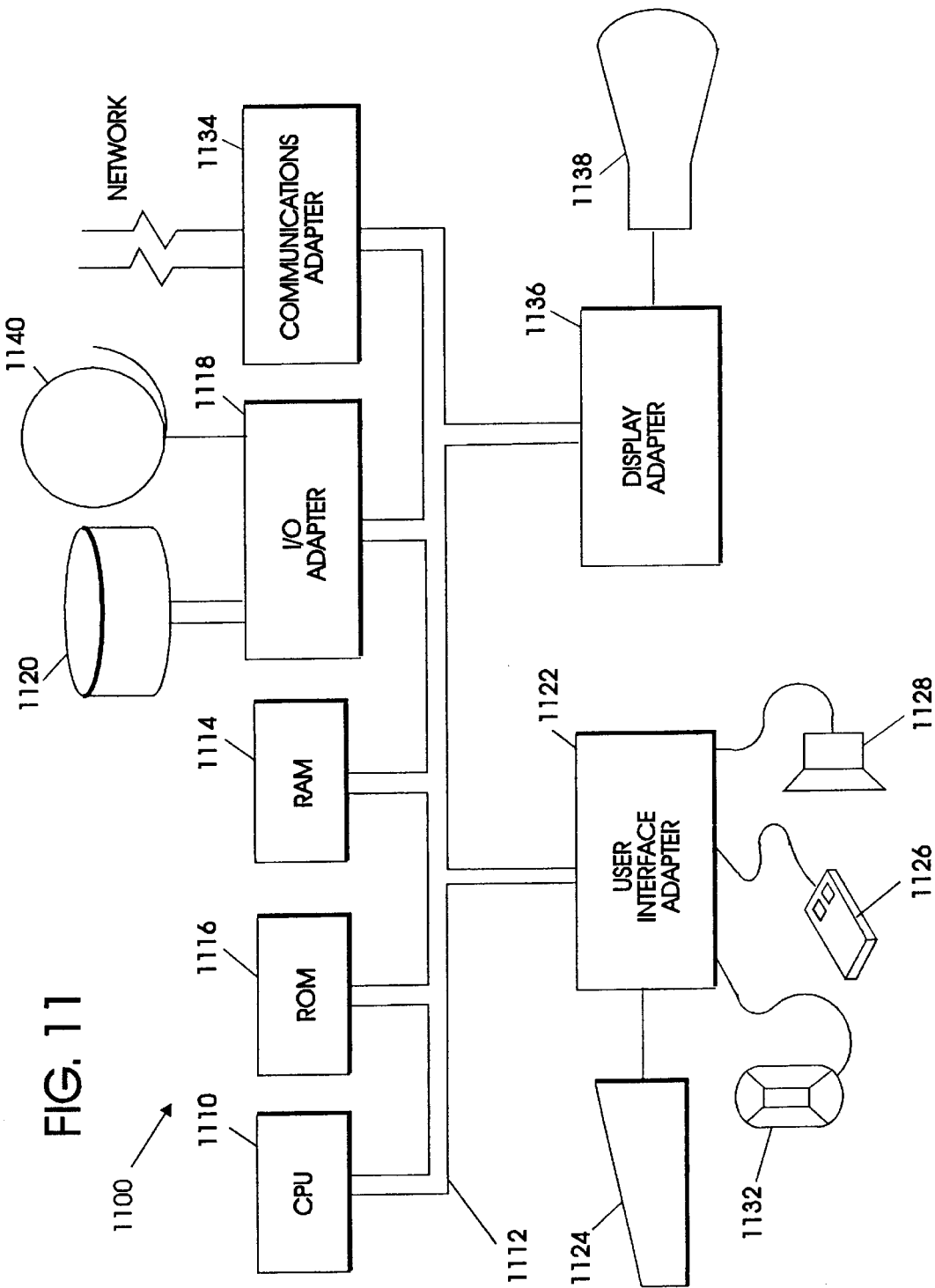
FIG. 11 illustrates, in block diagram form, a data processor, implemented in accordance with one embodiment of the present invention.

It should be noted that each of intelligent peripheral 116, processing system 118, and network control center 110 may be implemented as a data processing system 1100 as illustrated in FIG. 11. Referring first to FIG. 11, an example is shown of a data processing system 1100 which may be used for the invention. The system has a central processing unit (CPU) 1110. The CPU 1110 is coupled to various other components by system bus 1112. Read only memory ("ROM") 1116 is coupled to the system bus 1112 and includes a basic input/output system ("BIOS") that controls certain basic functions of the data processing system 1100. Random access memory ("RAM") 1114, I/O adapter 1118, and communications adapter 1134 are also coupled to the system bus 1112. I/O adapter 1118 may be a small computer system interface ("SCSI") adapter that communicates with disk storage devices 1120 and 1140. Communications adapter 1134 interconnects bus 1112 with an outside network enabling the data processing system to communicate with other such systems. Input/Output devices are also connected to system bus 1112 via user interface adapter 1122 and display adapter 1136. Keyboard 1124, track ball 1132, mouse 1126 and speaker 1128 are all interconnected to bus 1112 via user interface adapter 1122. Display monitor 1138 is connected to system bus 1112 by display adapter 1136. In this manner, a user is capable of inputting to the system throughout the keyboard 1124, trackball 1132 or mouse 1126 and receiving output from the system via speaker 1128 and display 1138. Additionally, an operating system such as AIX ("AIX" is a trademark of the IBM Corporation) is used to coordinate the functions of the various components shown in FIG. 11.

Preferred implementations of the invention include implementations as a computer system programmed to execute the method or methods described herein, and as a computer program product. According to the computer system implementation, sets of instructions for executing the method or methods are resident in the random access memory 1114 of one or more computer systems configured generally as described above. Until required by the computer system, the set of instructions may be stored as a computer program product in another computer memory, for example, in disk drive 1120 (which may include a removable memory such as an optical disk or floppy disk for eventual use in the disk drive 1120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 5:
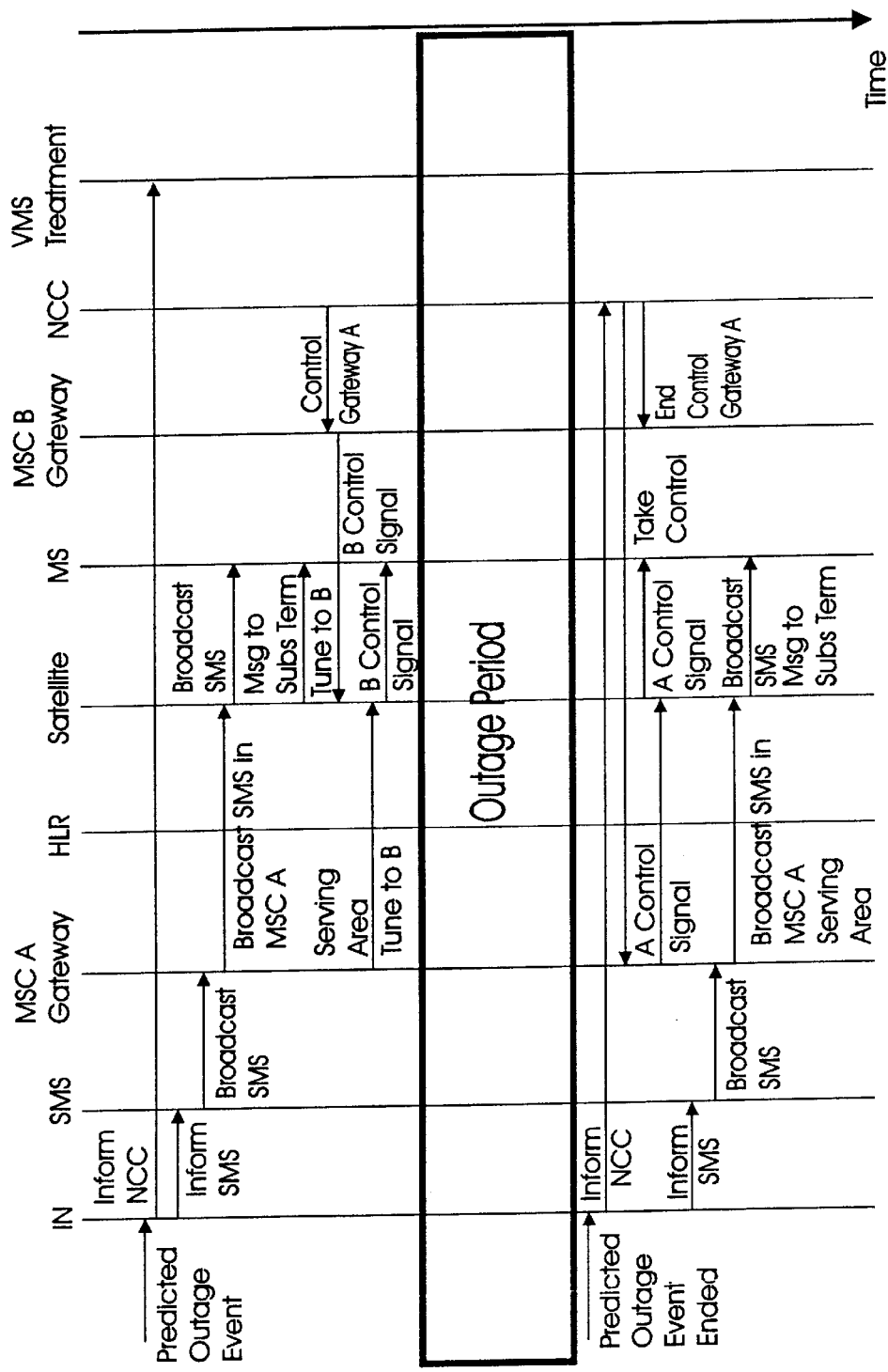
FIG. 5 illustrates, in a timeline diagram, a subscriber notification operation in accordance with one embodiment of the present invention.

Operation of the present invention will be subsequently be described with reference to the communication environment illustrated in FIG. 1 and a time line illustrated in FIG. 5. A first step of the methodology implemented in one embodiment of the present invention notifies subscribers that an outage will occur in the near future. Again, as previously described, such outages are typically predictable. For example, in a GEO satellite system, a sun transit interruption occurs regularly once a week from two to four minutes. Additionally, scheduled maintenance or the various components of the communication network is also easily predictable. Given the predictability of certain outages and disruptions in communication services, the present invention implements a method for notifying a subscriber about an impending outage event and the corresponding description of service.

In one embodiment of the present invention, an intelligent peripheral, such as intelligent peripheral 116 of communication network 100, determines when the event will occur using an automatic forecasting algorithm. In the alternative, an external user or device (not illustrated herein) may manually trigger an indication of an outage event. Intelligent peripheral 116 then informs network control center 112 that an outage event will occur at a point in time. Additionally, intelligent peripheral 116 informs processing system 118 that the outage event has been triggered. In response to this information, processing system 118 provides control and data information to Gateway A 110, to broadcast a short message service message to all impacted subscribers in all beams served by Gateway A 110 through the use of satellite 102. The SMS message then indicates that an outage event will occur at a certain point in time. Additionally, Gateway A 110 will provide control signals to Gateway B 104 via satellite 102 to indicate that each of the mobile subscribers within MSC A 110 should be tuned to MSC B. In this manner, a "virtual roaming" operation is executed, wherein the mobile subscribers served by MSC A 110 appear to have all traveled, or roamed, to an area serviced by MSC B 104 in accordance with the previously described roaming techniques of the present invention. By utilizing satellite 102 to connect the control information between MSC A 110 and MSC B 104, this roaming operation is effectively performed in an efficient manner that allows users to maintain their communications without interruptions.

During the "virtual roaming" operation, mobile subscribers previously served by Gateway A 110 will be tuned to a new control channel of Gateway B 104. Thus, during the outage period, Gateway B 104 controls and allows information to be communicated to each of the mobile subscribers previously served by Gateway A 110. It should be noted that all calls currently in progress before the transfer operation is executed may be discarded if Gateway A 110 and Gateway B 104 do not have a traffic path connection via PSTN 108. However, during the outage period, subscribers which receive the "virtual roaming" service can originate or receive calls.

After the outage period, network control center 112 is informed that the predicted outage event has ended by intelligent peripheral 116. Again, the outage completion mechanism may be triggered automatically or manually. Upon receipt that the predicted outage event has ended, network control center 112 enables Gateway B 104 to relinquish control of beams previously served by Gateway A 110. Gateway A 110 subsequently sends control signals to beams within that area via satellite 102. Upon receipt of a control signal indicating that the virtual roaming operation has ended, the mobile subscribers will tune to a new control channel corresponding to Gateway A 110. After tuning to the new control channel, Gateway A 110 enables processing system 118 to generate an SMS message to be broadcast to all mobile subscribers within an area controlled by Gateway A 110 that the outage is over. For more information about generation of an SMS message, refer to the aforementioned, co-pending patent application entitled "Methods and Apparatus for Providing Communications to Telecommunications Terminals," filed , Feb. 26, 1998, Ser. No. 09-032,504, which was previously hereby incorporated by reference herein.

Figure 6:
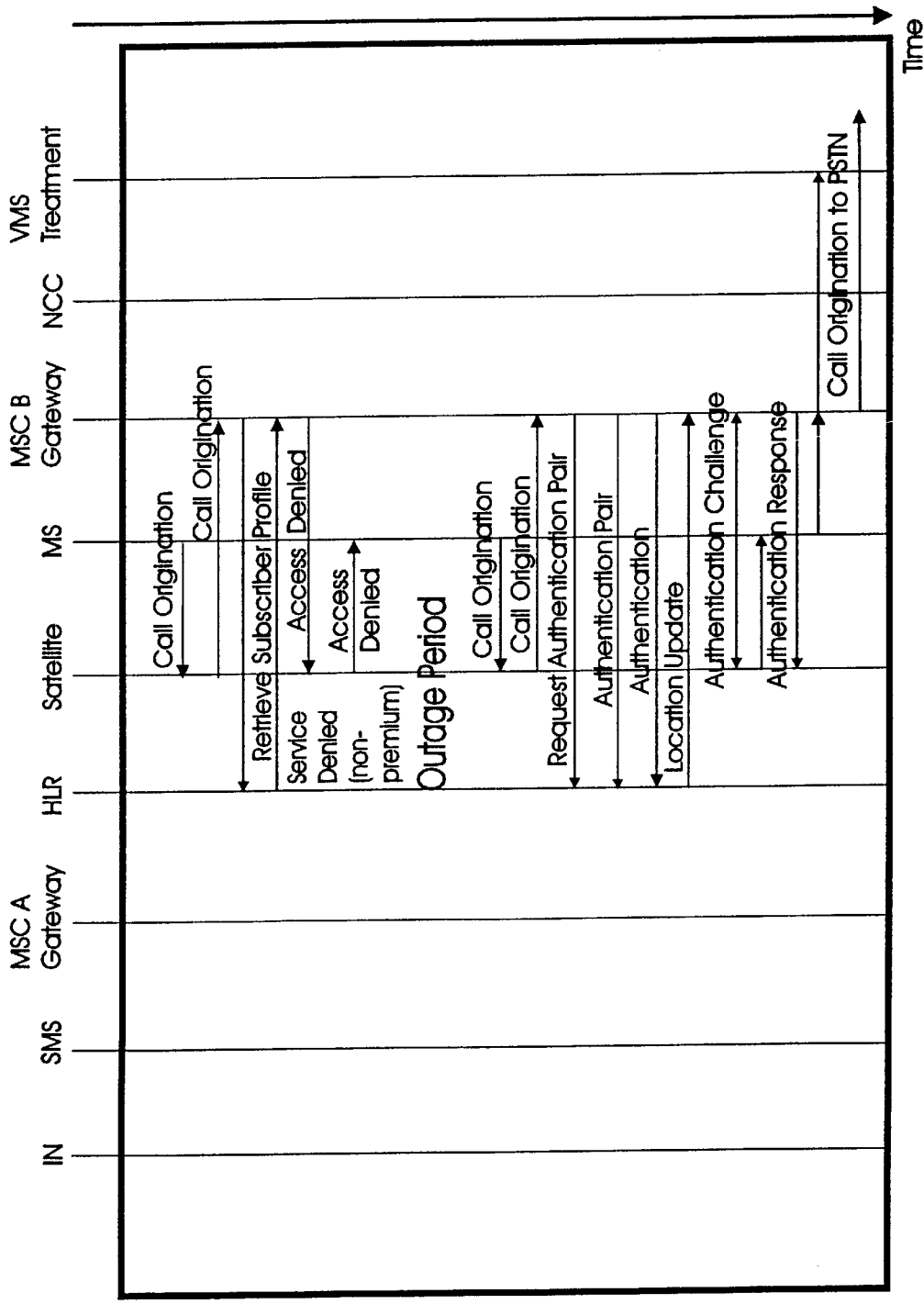
FIG. 6 illustrates, in a timeline diagram form, a call routing operation in accordance with one embodiment of the present invention.

Refer now to FIG. 6. Should a mobile subscriber that is being served by Gateway A 110 desire to originate a call while an outage period exists for the area served by Gateway A 110, the ability of the mobile subscriber to make that call will depend upon the services subscribed by the mobile subscriber. For call origination by a mobile subscriber that has not subscribed to the services provided by the present invention, the mobile subscriber will originate a call and communicate the call to satellite 102. Satellite 102 will subsequently indicate that a call has been originated to the MSC as served by Gateway B 104. Gateway B 104 will then determine if a profile for mobile subscriber 106 is stored in its VLR during a first step of an authentication process. It should be noted that authentication is a security-related function that protects a network against unauthorized access and protects users from fraudulent impersonations. Authentication is achieved by a secure check operation that the subscriber/user identity provided by a mobile subscriber terminal corresponds to the actual subscriber. If the subscriber has not subscribed to the services provided by the present invention, access and service will be denied by the MSC of Gateway B 104. Satellite 102 will then communicate the denial from the MSC to the mobile subscriber that their access has been denied.

For premium subscribers, a similar set of steps is executed. However, when the MSC as served by Gateway B 104 inquires about the authentication of the telephone call using HLR 114, HLR 114 will provide a subscriber profile, including a location update to the MSC of Gateway B 104. The subscriber profile also indicates if mobile subscriber 106 is allowed to originate new calls during a serving gateway outage. The MSC (104) should have the premium subscriber's profile stored in its VLR from the registration and locations update procedure triggered by the "virtual routing" operation of the present invention. During call origination, Gateway B 104 may optionally require mobile subscriber 106 to be authenticated again. If authentication is invoked, MSC B requests a pair of authentication challenge and authentication response data from HLR 114. MSC B (104) then sends an authentication challenge message to mobile subscriber 106 containing the authentication challenge data from HLR 114. Mobile subscriber 106 responds with an authentication response message. The MSC (104) will compare the authentication response data from HLR 114 with the content of the authentication response message from mobile subscriber 106 to determine the authenticity of mobile subscriber 106. Gateway B 104 subsequently delivers the call to PSTN 108, as though the call was a normal mobile subscriber call originating in terrestrial cellular networks.

Figure 7:
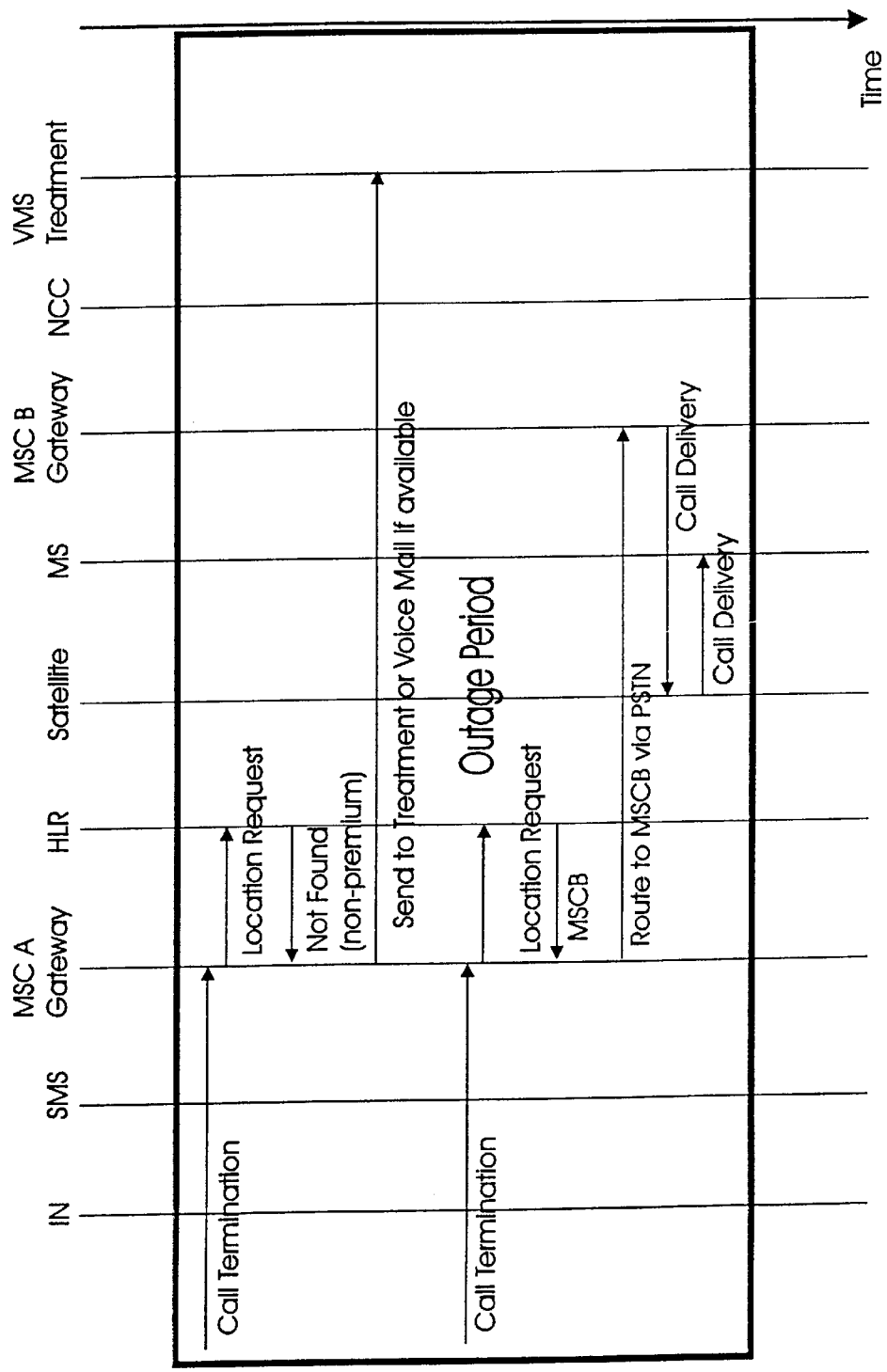
FIG. 7 illustrates, in a timeline diagram form, a call routing operation in accordance with one embodiment of the present invention.

Refer now to FIG. 7 for a general description of the steps executed during the outage period when a call is terminated during that period. If a telephone call arrives for a subscriber during the outage period and the subscriber does not have the services of the present invention, an MSC corresponding to users within control of Gateway A 110 will request a location update of the mobile subscriber from HLR 114. If HLR 114 had not received a revised location from a MSC corresponding to users within control of Gateway B 104, HLR 114 indicates that the mobile subscriber terminal 106 is served by an MSC corresponding to Gateway A 110. The MSC corresponding to Gateway A 110 then routes the call to either a voice mail service if the user was so subscribed and such service was available, or to a voice treatment provided by a processing system corresponding to the current MSC. In one embodiment of the present invention, the voice mail service may be provided by an application executed by data processing system 118. Alternatively, a treatment within the MSC or the VLR may indicate that the subscriber is not available at this point in time. Additionally, other messages or indications may also be provided to indicate the unavailability of this mobile subscriber.

However, if the mobile subscriber has subscribed to the services of the present invention and is, therefore, a premium subscriber, a location request to HLR 114 will identify Gateway B 104 as being a location that provides service for the mobile subscriber. Subsequently, the MSC serving Gateway A 110 will initiate a Gateway MSC call to a MSC corresponding to Gateway B 104. The MSC corresponding to Gateway B 104 would have registered the subscriber as a visitor within its VLR (not illustrated in detail) and will deliver the call to the mobile subscriber as though the mobile subscriber was a "roamer". Hence, the term "virtual roaming" may be used to describe the services provided to the mobile subscriber, even though the mobile subscriber has actually not roamed to an area served by the MSC corresponding to Gateway B 104. It should be noted that such operations may be executed because of the large area served by each of the Gateways in a mobile communication network and by the coverage available using a satellite, such as satellite 102.

Figure 8:
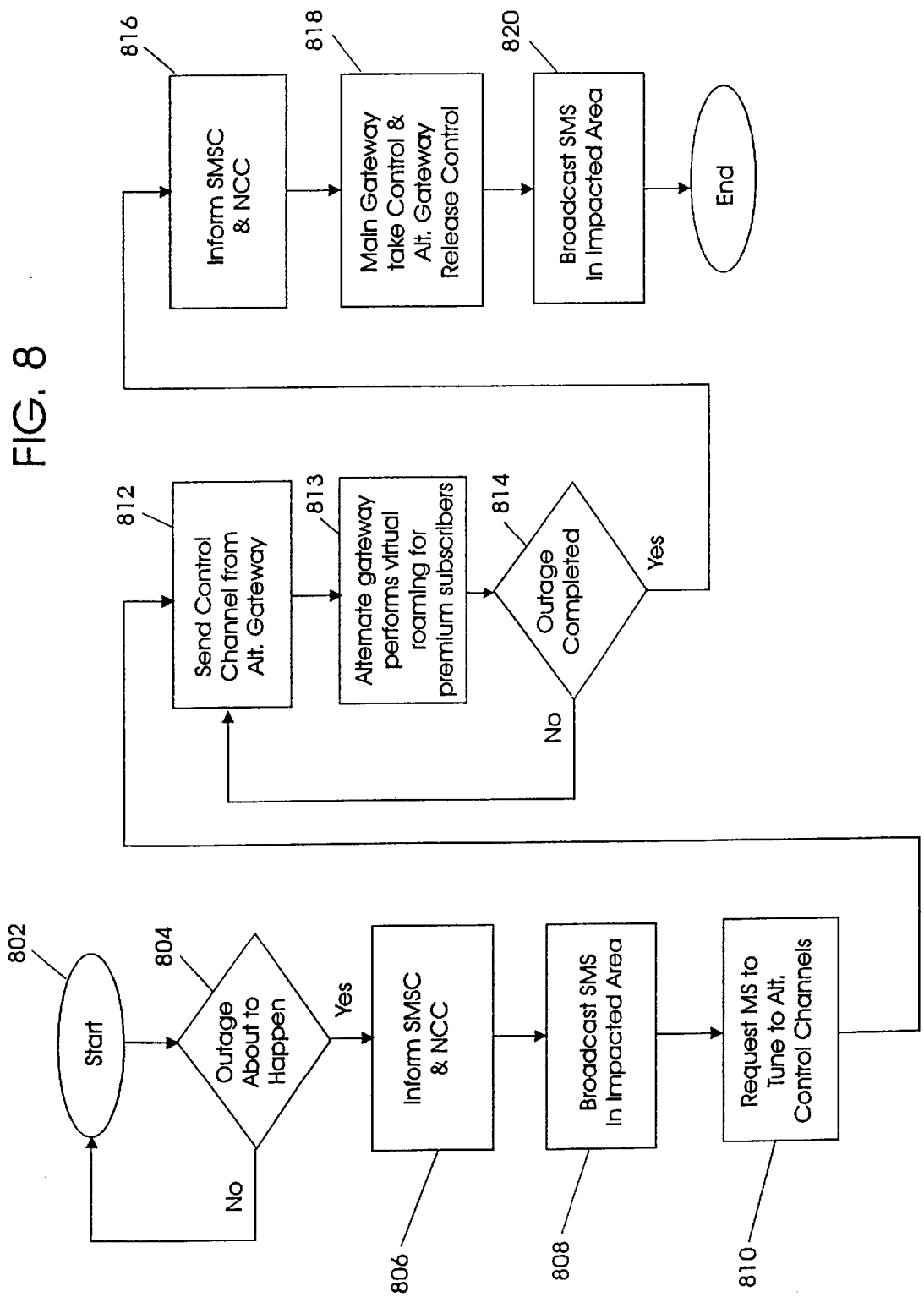
FIG. 8 illustrates, in a flow diagram form, a methodology implemented to notify a subscriber of a predicted outage in accordance with one embodiment of the present invention.

FIG. 8 illustrates, in flow diagram form, a methodology implemented to notify a mobile subscriber that a predicted outage will occur. It should be noted that this operation is controlled by network control center 112, which may be implemented as a data processing system such as that illustrated in FIG. 11.

The notification process is initiated in a step 802. Subsequently, in a step 804, a device determines whether the outage will occur. In one embodiment of the present invention, the device is an intelligent peripheral, such as intelligent peripheral 116 of FIG. 1. If the outage will not occur, a program flow returns to step 802. However, if the outage does occur, both network control center 112 and short message service center 118 are informed of the outage in a step 806. Short message service 118 center is then enabled to broadcast a message to the mobile subscribers in an impacted area in a step 808. In a step 810, network control center 112 requests that all mobile subscribers within the impacted area tune themselves to an alternate control channel. Subsequently, control information is sent from an alternate gateway in a step 812.

Upon receiving the control channel from alternate gateway, all mobile subscribers from the main gateway "register" with the alternate gateway. For each registration, the alternate gateway will access the HLR and retrieve the subscriber profiles to determine which mobile subscribers are premium subscribers. If a mobile subscriber is a premium subscriber, the alternate gateway will perform a location update, informing the HLR that the mobile subscriber is now served by the alternate gateway and is no longer served by the main gateway. All subsequent calls to the mobile subscriber are forwarded to the alternate gateway. Thus, the premium subscriber from the main gateway has "virtually roamed" to the alternative gateway (step 813). For mobile subscribers that did not subscribe to the premium service, the alternate gateway will not perform a location update and calls will not be forwarded.

In a step 814, a device, such as intelligent peripheral 118, determines whether the outage has been completed. If not, a program flow returns to step 814. If the outage is complete, the short message service center (118) and the network control center (112) are informed of the completion in a step 816. In a step 818, a main gateway assumes control of the mobile subscribers and the alternate gateway releases control of the mobile subscribers. The alternate gateway will broadcast a message to all mobile subscribers to perform a gateway selection procedure equivalent to the power-on gateway selection. Upon completion of the procedure, all mobile subscribers originally served by the main gateway re-register with the main gateway and all mobile subscribers originally served by the alternate gateway stay with the alternate gateway. When the premium mobile subscribers re-register with the main gateway, the main gateway retrieves the subscriber profile from HLR and performs a location update back to the main gateway. Non-premium subscribers resume availability of their service. Lastly, a short message service is broadcast to the impacted area to indicate that the outage has been completed.

Figure 9:
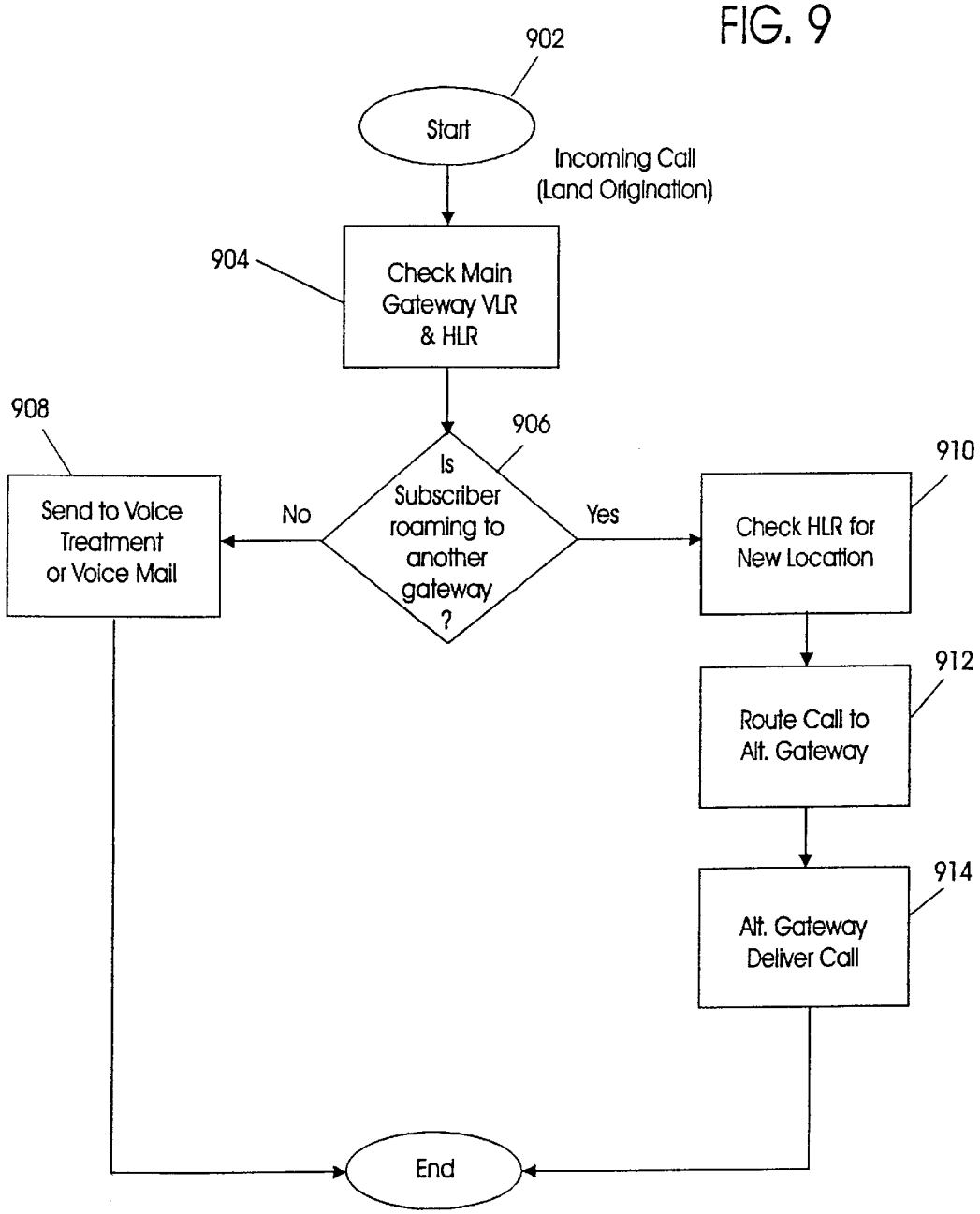
FIG. 9 illustrates, in a flow diagram form, a methodology used to implement an incoming call in a communication system in accordance with one embodiment of the present invention.

FIG. 9 illustrates a methodology for performing incoming call delivery. In a first step 902, a call delivery methodology is initiated. In response to an incoming call, a gateway to which the calls have been switched reviews the information stored within its VLR in a step 904. During that examination, an MSC corresponding to the gateway receiving the calls determines if the subscriber is roaming away from the main gateway. According to the notification procedure described in FIG. 8, all premium subscribers from the main gateway are roaming in the alternate gateway in the HLR. All non-premium subscribers are indicated as staying in the main gateway by the HLR. As previously explained, a premium subscriber is a subscriber that has subscribed to the services offered by the methodology and data processing system of the present invention. If the call is not for a premium subscriber, the VLR of the original gateway MSC indicates the subscriber is staying with the original MSC. The MSC of the original gateway then denies access and communicates that denial to the mobile subscriber via a satellite in a step 908. Furthermore, in step 908, such a denial may result in control and data information being sent from a treatment or a voice mail service to the mobile subscriber to indicate that access has been denied. Such treatments and voice mail services are well-known to those with skill in the art and, therefore, will not be described in greater detail herein.

However, if the telephone call is for a premium subscriber, the MSC of the original gateway will check an HLR therein to determine a new location for the mobile subscriber. Subsequently, in a step 912, the originating gateway will route the telephone call to a visited gateway using PSTN (108) in a step 912. The alternate gateway is then enabled to deliver the call to the mobile subscriber, as though the mobile subscriber was "roaming" therein in a step 914. A program flow subsequently terminates.

Figure 10:
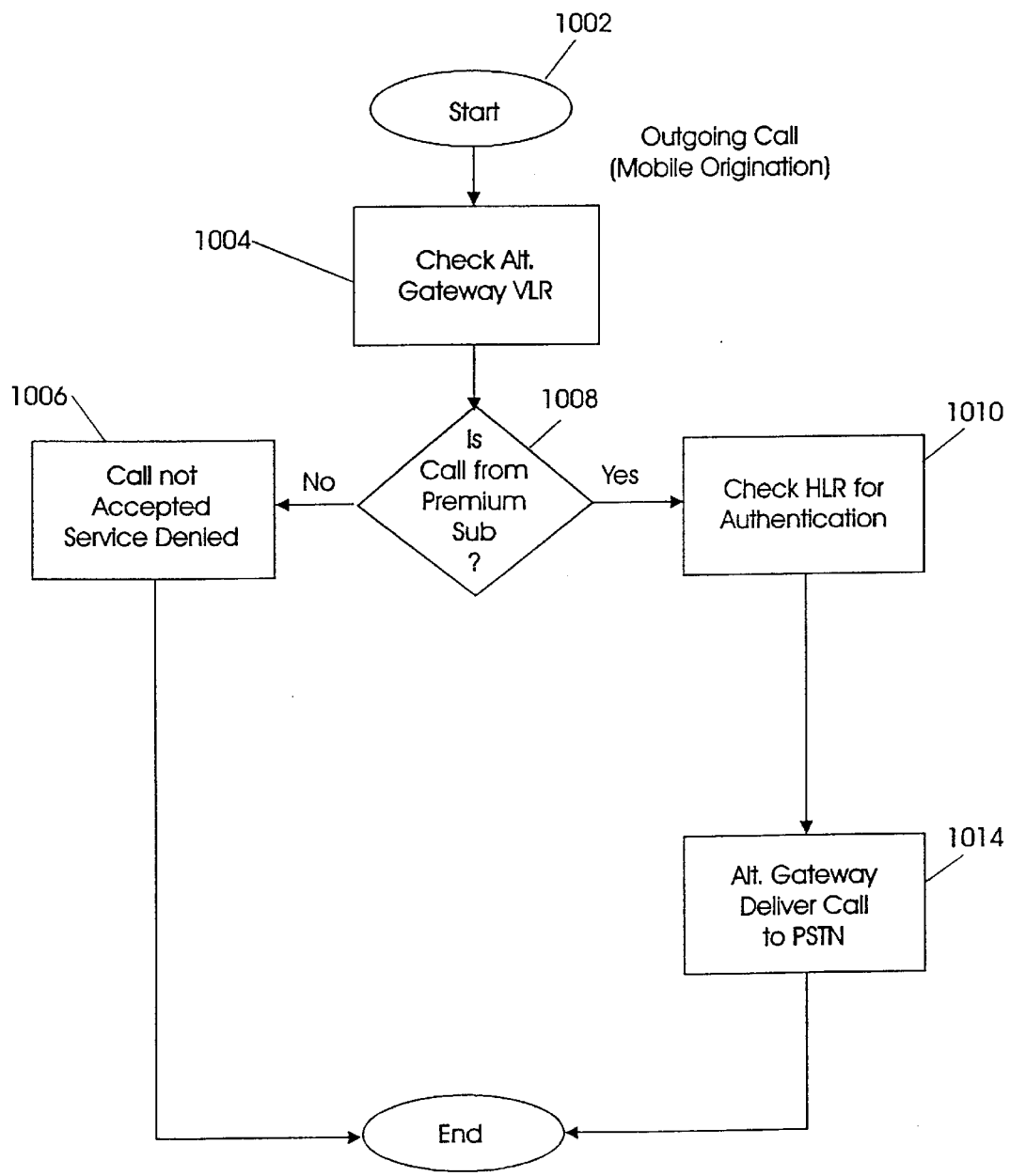
FIG. 10 illustrates, in a flow diagram form, a methodology used to implement an outgoing call delivery operation in accordance with one embodiment of the present invention.

FIG. 10 illustrates a flowchart of a methodology implemented to deliver a telephone call from a mobile subscriber within an area impacted by an interruption in service thereto. A methodology is initiated in a step 1002. A satellite transfers the originated call from the mobile subscriber to a gateway to which the mobile subscribers calls are being transferred. An MSC of that gateway then communicates with its own VLR in a step 1004. Subsequently, the VLR indicates whether the user from which the call is originating is a premium subscriber in a step 1008. If the call is not from a premium subscriber, the call is not accepted by the MSC of the "visited" gateway and access is denied. The denial of access is transferred to the mobile subscriber via the satellite.

However, if the call is from a premium subscriber, the HLR of the area impacted by the disruption of service is checked for authentication in a step 1010. The alternate gateway is then enabled to deliver the call to a public switch telephone network in a step 1014. The call is later terminated.

It should be noted that the description provided herein is but one example of an implementation of the present invention. It should be noted that many additional implementations may also be utilized to realize the present invention. For example, access may be provided for all mobile subscribers and may not depend upon the mobile subscribers becoming premium subscribers, as defined herein. Additionally, alternate methodologies may be used to indicate that an outage is about to occur. Such alternate methodologies may include manual indications, as well as other automated termination indicators. Furthermore, the protocols set forth herein are provided for guidance and may not be adhered to strictly in every embodiment of the present invention.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A communication system, comprising:
   first communication means for selectively routing data to a first device in response to a first plurality of control signals, the first communication means detecting a first outage event and providing a second plurality of control signals in response to the first outage event;
   second communication means; and
   a satellite for communicating the first plurality of control signals and the second plurality of control signals with the first communication means, the satellite selectively rerouting the first plurality of control signals from the first communication means to the second communication means in response to the second plurality of control signals.

2. The communication system of claim 1, wherein the first outage event is a predictable outage event.

3. The communication system of claim 2, wherein the predictable outage event is a sun transit event.

4. The communication system of claim 1, wherein the satellite has a geo-stationary orbit.

5. The communication system of claim 1, wherein the first device is a mobile telephone.

6. The communication system of claim 1, wherein the first communication means, comprises:
an intelligent peripheral device for detecting the first outage event; and
a first gateway coupled to the intelligent peripheral device for generating the second plurality of control signals in response to the first outage event and for communicating the second plurality of control signals to the satellite.

7. The communication system of claim 6, wherein the second communication means comprises:
a second gateway for selectively receiving the first plurality of control signals from the satellite.

8. The communication system of claim 7, wherein the first communication means further comprises:
a network control device coupled to the first gateway and coupled to the second gateway, the network control device selectively enabling one of the first gateway and the second gateway to respond to the first plurality of control signals.

9. The communication system of claim 8, wherein the first device is a mobile telephone and wherein the first communication means further comprises:
a home location register coupled to the intelligent peripheral and coupled to the first gateway, the home location register indicating a relative location of the mobile telephone.

10. The communication system of claim 9, further comprising:
a public switched telephone network for selectively routing a telephone call to the mobile telephone subscriber through the second gateway.

11. The communication system of claim 10, wherein the public switched telephone network selectively routes the telephone call to the mobile telephone subscriber through the second gateway when the first outage event occurs.

12. A method for operating a communication system having a user, comprising the steps of:
detecting a first outage event;
providing a first plurality of control signals to a satellite;
communicating a first message to the user to indicate that the first outage event has been detected;
enabling a first gateway to selectively route data to the user in response to a first plurality of control signals;
providing a second plurality of control signals in response to the first outage event; and
enabling the satellite to reroute a first incoming message from the first gateway to a second gateway in response to the second plurality of control signals.

13. The method of claim 12, wherein the first outage event is a predictable outage event.

14. The method of claim 13, wherein the predictable outage event is a sun transit event.

15. The method of claim 12, further comprising the steps of:
detecting a termination of the first outage event;
providing a third plurality of control signals to the satellite; and
communicating a second message to the user to indicate that the termination of the first outage event has been detected.

16. The method of claim 15, further comprising the step of:
enabling the satellite to reroute a second incoming message from the second gateway to the first gateway in response to the third plurality of control signals.

17. The method of claim 12, wherein the first message is a short message service message.

18. The method of claim 12, wherein the user is a mobile telephone subscriber having a mobile telephone associated with a first mobile switching center.

19. The method of claim 18, further comprising the step of:
tuning the mobile telephone to be associated with a second mobile switching center in response to the first message.

20. The method of claim 19, further comprising the step of:
enabling a network control center to transfer an incoming message from the first mobile switching center to the second mobile switching center in response to the first message.

21. The method of claim 12, further comprising the steps of:
detecting a termination of the first outage event;
providing a third plurality of control signals to the satellite; and
communicating a second message to the user to indicate that the termination of the first outage event has been detected.

22. A program storage device readable by a machine, tangibly embodying a program of instructions executable by the machine to perform method steps for communicating a first incoming message to a user of a communication system, the method steps comprising:
detecting a first outage event;
providing a first plurality of control signals to a satellite;
communicating a first message to the user to indicate that the first outage event has been detected;
enabling a first gateway to selectively route data to the user in response to a first-plurality of control signals;
providing a second plurality of control signals in response to the first outage event; and
enabling the satellite to reroute a first incoming message from the first gateway to a second gateway in response to the second plurality of control signals.

23. The program storage device of claim 22, wherein the first outage event is a predictable outage event.

24. The method steps of claim 22, further comprising the steps of:
detecting a termination of the first outage event; providing a third plurality of control signals to the satellite; and communicating a second message to the user to indicate that the termination of the first outage event has been detected.

25. The method steps of claim 24, further comprising the step of:

enabling the satellite to reroute a second incoming message from the second gateway to the first gateway in response to the third plurality of control signals.

26. The program storage device of claim 22, wherein the user is a mobile telephone subscriber having a mobile telephone associated with a first mobile switching center.

27. The method steps of claim 26, further comprising the step of:

tuning the mobile telephone to be associated with a second mobile switching center in response to the first message.

28. The method steps of claim 27, further comprising the step of:

enabling a network control center to transfer an incoming message from the first mobile switching center to the second mobile switching center in response to the first message.

29. A method for operating a satellite to gateway communication system having comprising the steps of:

separating users connected to a first gateway between a first group of users and a second group of users, said first group of users being given routing priority over the second group of users during an outage;

detecting an outage event between a satellite and the first gateway; and routing the first group of users from said first gateway to a second gateway during the outage event.

30. The method of claim 29, wherein:

the first gateway is typically used by the selected group of subscribers; and incoming calls to said second group of users are blocked during the outage event.

31. The method of claim 29, wherein the second gateway remains operable during the outage event and the first gateway becomes inoperable during the outage event.

32. A communication system having a user, comprising:

means for detecting a first outage event;

means for providing a first plurality of control signals to a satellite; and means for communicating a first message to the user to indicate that the first outage event has been detected;

means for enabling a first gateway to selectively route data to the user in response to a first plurality of control signals;

means for providing a second plurality of control signals in response to the first outage event; and means for enabling the satellite to reroute a first incoming message from the, first gateway to a second gateway in response to the second plurality of control signals.

33. The communication system of claim 32, wherein the first outage event is a predictable outage event.

34. The communication system of claim 32, further comprising:

means for detecting a termination of a first outage event;

means for providing a third plurality of control signals to the satellite; and means for communicating a second message to the user to indicate that the termination of the first outage event has been detected.

35. The communication system of claim 34, further comprising:

means for enabling the satellite to reroute a second incoming message from the second gateway to the first gateway in response to the third plurality of control signals.

* * * * *

UNITED STATES PATENT AND TRADEMARK OFFICE
CERTIFICATE OF CORRECTION

PATENT NO. : 6,070,073
DATED : May 30, 2000
INVENTOR(S) : Maveddat et al.

It is certified that error appears in the above-identified patent and that said Letters Patent is hereby corrected as shown below:

Column 1, line 4  After the Title, insert
--TECHNICAL FIELD
The present invention relates in general to a satellite communication network and, more particularly, to a system and method for notifying subscribers and routing calls during a predicted description of service in the satellite communication network.--

Column 1, line 65  Delete "gateways 10"
Insert --Gateways 110--

Column 5, line 33  Delete the (") after "virtual"

UNITED STATES PATENT AND TRADEMARK OFFICE
CERTIFICATE OF CORRECTION

PATENT NO. : 6,070,073
DATED : May 30, 2000
INVENTOR(S) : Maveddat et al.

It is certified that error appears in the above-identified patent and that said Letters Patent is hereby corrected as shown below:

Column 5, line 43    Delete "first"
Insert --second--

Column 6, line 58    Delete "after," and insert --, after which--

Column 8, line 22    Delete "be" (second occurrence)

Column 8, line 31    Delete "or"
Insert --for--

Column 15, line 19    Delete "having"

Column 16, line 15    Delete "," after "the"

Signed and Sealed this

Third Day of April, 2001

*Attest:*

NICHOLAS P. GODICI

*Attesting Officer*    *Acting Director of the United States Patent and Trademark Office*